Figure 1:
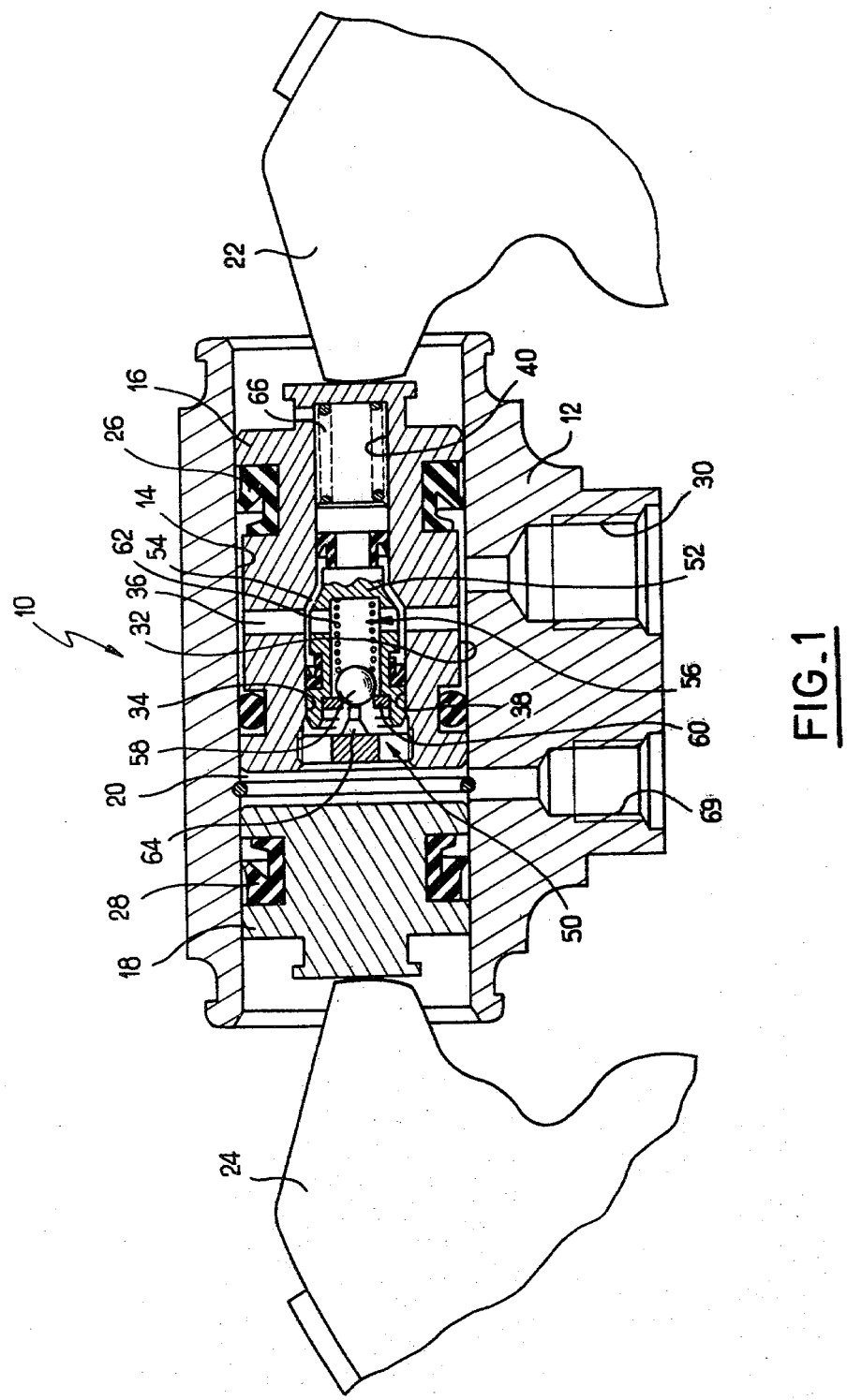

United States Patent [19]

Riquart et al.

[11] 4,292,883
[45] Oct. 6, 1981

[54] WHEEL CYLINDER

[75] Inventors: Christian Riquart, Paris; Roland Levrai, Stiarns, both of France

[73] Assignee: Societe Anonyme DBA, Drancy, France

[21] Appl. No.: 54,320

[22] Filed: Jul. 2, 1979

[51] Int. Cl.³ .......................................... F15B 13/042
[52] U.S. Cl. .......................................... 91/29; 91/422; 188/349; 303/6 C
[58] Field of Search ............... 188/349, 351, 196 A, 188/361, 363, 364; 91/422, 433, 468, 29; 303/6 C

[56] References Cited

U.S. PATENT DOCUMENTS

| 2,207,173 | 7/1940 | Goepfrich | 188/349 |
|---|---|---|---|
| 2,282,556 | 5/1942 | Bowen | 91/468 X |
| 2,858,804 | 11/1958 | Banker | 91/422 |
| 3,707,210 | 12/1972 | Nyunoya et al. | 91/422 X |
| 3,866,984 | 2/1975 | Seip | 303/6 C X |
| 3,904,253 | 9/1975 | Riquart | 303/6 C |
| 4,188,073 | 2/1980 | Ishikawa et al. | 303/6 C X |

FOREIGN PATENT DOCUMENTS

| 1430226 | 2/1962 | Fed. Rep. of Germany. | |
| 1488395 | 4/1966 | France. | |
| 1537852 | 7/1968 | France | 188/363 |
| 2219862 | 10/1974 | France. | |
| 49-1901 | 1/1974 | Japan. | |
| 49-1902 | 1/1974 | Japan. | |
| 50-7425 | 5/1975 | Japan. | |
| 646825 | 11/1950 | United Kingdom | 188/364 |
| 490978 | 9/1975 | U.S.S.R. | |

*Primary Examiner*—George E. A. Halvosa
*Attorney, Agent, or Firm*—Paul David Schoenle; Ken C. Decker

[57] ABSTRACT

A wheel cylinder includes a housing defining a bore. A piston is reciprocably received in the bore and cooperates with the housing to define a pressure chamber. The wheel cylinder comprises a passage for supplying pressurized fluid to the pressure chamber from a fluid pressure source. The supply passage includes a first portion defined by an annular groove on the piston and a blind axial bore in the piston which communicates with both the annular groove and with the pressure chamber. A valve apparatus is received in the blind bore and modulates the fluid pressure supplied to the pressure chamber as a function of the fluid pressure provided by the pressure source.

2 Claims, 2 Drawing Figures

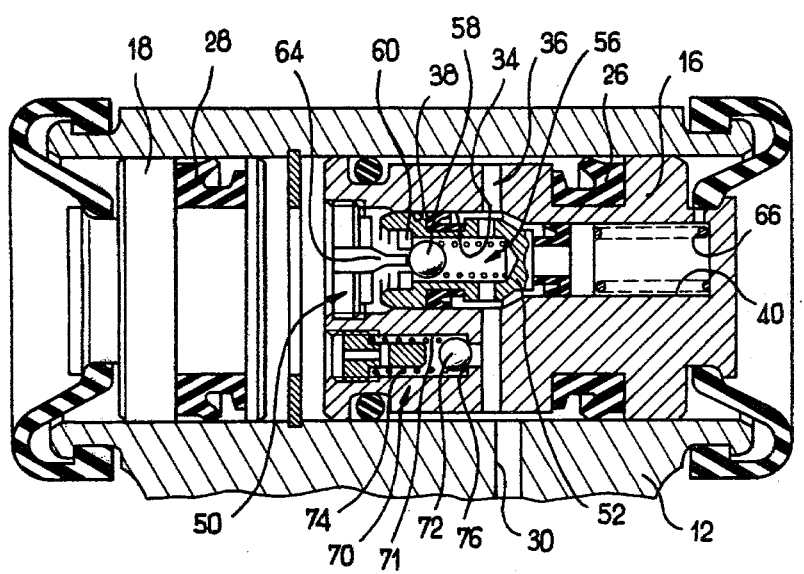
FIG_2

WHEEL CYLINDER

The invention relates to a wheel cylinder.

In vehicle brake systems, it is conventional to control the pressure of fluid in the brake motors associated with the rear wheels of the vehicle, using brake-adjusting valves disposed between the pressure fluid source and the brake motors.

It is therefore necessary to provide two pipe systems, one connecting the pressure fluid source to the inlet orifice of the adjusting valve and the other connecting the outlet orifice of the valve to the associated brake motor. Such a structure has the disadvantage of requiring a number of hydraulic connections between the pressure source and the adjusting valve and between the valve and the brake motor, which increases the complexity and the risk of breakdown relative to a brake system without an adjusting valve.

Furthermore, in brake systems equipped in conventional manner with an adjusting valve connected by a flexible coupling to the corresponding brake motor, the absorption to be considered is that of the brakes and of the flexible coupling, which delays the effects of the adjusting valve.

When a brake system equipped in conventional manner with an adjusting valve is drained, air bubbles may be trapped in the valve when the brake motor is being drained, thus disadvantageously increasing the travel of the pedal when the brakes are subsequently applied. To obviate this disadvantage, the valve has to be oriented in an inclined direction when mounted on the vehicle.

In cold weather, the liquid flowing in the adjusting valve disposed under the vehicle body is relatively viscous which slows down the flow of fluid and thus disadvantageously affects the response time of the brake system, without it being possible to reheat the liquid during operation of the brake.

The object of the invention is to provide a device for obviating the aforementioned disadvantages, more particularly for improving the response time of a brake system equipped with one or more adjusting valves.

The invention provides a wheel cylinder comprising a body with a bore formed therein and at least one actuating piston slidably mounted in the bore at one end thereof and bounding a pressure chamber therein, said piston being adapted to be movable towards the exterior of the bore for urging a first shoe of a drum brake, said cylinder comprising a supply passage for supplying said pressure chamber with fluid under pressure from a source thereof, a valve adapted to modulate the pressure in said pressure chamber according to the pressure supplied by said source being incorporated in said wheel cylinder characterized in that said supply passage comprises a first portion including: an annular groove provided in said actuation piston and receiving fluid under pressure from said source, a blind axial bore provided in said actuation piston and in fluid communication on the one hand with said pressure chamber and on the other hand with said annular groove, said valve being mounted within said blind axial bore of said actuating piston.

The invention will now be described, and other advantages will appear clearly from the following description taken with references to the accompanying drawings, wherein:

FIG. 1 shows a preferred embodiment of the wheel cylinder according to the invention, and FIG. 2 shows an alternate embodiment of the wheel cylinder shown in FIG. 1.

In FIG. 1, the general reference 10 denotes a wheel cylinder comprising a body 12 formed with a bore 14. A first actuating piston 16 and a second actuating piston 18 are slidably mounted in bore 14 and define a pressure chamber 20 between them. Pistons 16 and 18 are adapted to urge shoes 22, 24 respectively (partly shown) of a drum brake, when the pistons are acted upon by the pressure in the pressure chamber 20. Each piston 16, 18 has an annular seal 26, 28 co-operating with bore 14 to seal chamber 20. The chamber is supplied with the pressure fluid from a pressure source (not shown) via a supply passage having a first portion comprising an inlet orifice 30 defined in body 12 and opening into the cylindrical wall of bore 14, and a second portion defined in piston 16 and comprising an annular groove 32, a blind axial bore 34 opening into chamber 20, and a radial connecting passage 36. At any axial position of piston 16, the annular groove is adapted to communicate with the inlet orifice 30, which in turn is connected to the pressure fluid source. The blind bore 34 is stepped; its bottom defines a small-diameter portion 40 and its open end defines a large diameter portion 38. A brake-adjusting valve (general reference 50) is disposed in bore 34. Valve 50 in the present case is a stationary brake compensator, the main features of which are known from the brake compensator described in the published French Patent Application No. 2 248 182, except that the compensator incorporated in the wheel cylinder is not controlled by the load but is a fixed compensator. Valve 50 comprises a differential piston 52 slidably mounted in sealing-tight manner in the stepped bore 34 of piston 16. The large section portion of the differential piston 52 slides in the large-diameter portion 38 of the bore and the end of the large section portion is adjacent the pressure chamber 20. The small section portion of piston 52 is subjected to the pressure in an annular chamber 54 communicating with the radial passage 36, i.e. with the supply pressure. A passage 56 extends through the differential piston 52 and comprises a radial portion and an axial portion connecting the annular chamber 54 to the pressure chamber 20. In the passage, a ball valve 58 is urged by a weak spring 62 towards a valve seat 60 mounted on the differential piston 52. The actuating piston 16 comprises a stationary abutment 64, and piston 52 is normally biased to the left (in FIG. 1) under the action of a spring 66 which bears against the bottom of the blind bore 34, so that abutment 64 raises valve 58 away from its seat 60. In FIG. 1, the differential piston 52 is shown in the position in which valve 58 occupies a limiting closure position.

The body 12 of wheel cylinder 10 also has a second orifice 69 which opens into the pressure chamber 20 and is used for simultaneously bleeding the wheel cylinder and the brake-adjusting valve.

The afore mentioned wheel cylinder operates as follows. During a first braking phase, the valve is in its open position and pressure chamber 20 receives fluid under pressure, without limitation, from the pressure source (not shown). In its second phase, at which the pressure has exceeded a predetermined limiting value, the adjusting valve comes into action and the rate at which pressure increases in chamber 20 is reduced in conventional manner in the ratio of the effective areas of the differential piston, resulting in successive openings and closings of the valve during the increase in the input pressure.

In the case of a brake system wherein the rear wheel brakes are each equipped with a wheel cylinder the lateral stability of the vehicle is still maintained by the adjusting valve associated with the intact wheel cylinder.

FIG. 2 shows an alternate embodiment of the wheel cylinder which is practically indentical with the wheel cylinder shown in FIG. 1, components identical with those in FIG. 1 being represented by the same references. The wheel cylinder in FIG. 2 further comprises a discharge valve 70 mounted in an axial passage 71 of piston 16 and connecting the radial passage 36 to chamber 20. Valve 70 has a ball 72 urged against the pressure in radial passage 36 by the spring 74 so as to abut a seat 76. During a first phase, the wheel cylinder in FIG. 2 operates in identical manner with FIG. 1, i.e. the pressure first increases in non-limited manner, after which, during a second phase of pressure increase in chamber 20 is restricted by action of the compensator. When the pressure difference between passage 36 and chamber 20 reaches a predetermined value sufficient to raise ball 72 from its seat against the action of spring 74, begins a third phase during which, any further increase in pressure in passage 36 is transmitted in full to the pressure chamber 20, so that the pressure again rises in normal manner. Thus, when the pressure from the source is high, valve 70 can be used to brake the vehicle more efficiently than by using a brake cylinder with an adjusting means as shown in FIG. 1.

The brake cylinders whose structure and operation have been described have the following advantages. The flow of fluid between the pressure source and the wheel cylinder is maintained by a single pipe system identical with that used in a brake system comprising drum brakes and without a brake-adjusting valve. Consequently, it is not necessary to modify the hydraulic piping when changing over from a vehicle equipped with wheel cylinders without an incorporated adjuster to a vehicle equipped with wheel cylinders with an adjusting valve. Since the adjusting valve is incorporated in the wheel cylinder, absorption problems are greatly reduced and delays are minimized.

Since, in the structure according to the invention, the adjusting valve is disposed near the drum brake shoes, i.e. near the friction surfaces, the heat produced during the first application of the brake will reduce the viscosity of the fluid in the adjusting valve, thus advantageously reducing the response time, particularly in cold weather.

Furthermore, as previously mentioned, the system according to the invention can be used for simultaneously draining the adjusting valve and the wheel cylinder. In addition, the adjusting valve thus disposed in the wheel cylinder is protected from dust and impurities, thus further increasing its reliability.

Although the wheel cylinders which have been described comprise two actuating pistons disposed in a bore, the invention of course applies equally to a wheel cylinder having a blind bore containing a single piston in which the brake adjusting valve is mounted.

We claim:

1. A wheel cylinder comprising:
   a body defining a bore therein, said bore having at least one open end;
   an actuating piston reciprocably received in said bore and sealingly cooperating with said body to define a pressure chamber;
   supply passage means defined in said wheel cylinder for communicating pressurized fluid from a source thereof to said pressure chamber, said supply passage means including an inlet orifice communicating with said bore, an annular groove on said actuating piston communicating with said inlet orifice, an axially-extending blind stepped bore having an end wall in said actuating piston, said stepped bore defining a small diameter portion adjacent the end wall thereof and a large diameter portion opening to said pressure chamber, and a radially extending flow path communicating said annular groove and said stepped bore;
   pressure-responsive valve means received in said stepped bore for opening and closing fluid communication through said supply passage means, said valve means including a stepped pressure-responsive piston reciprocably received in said stepped bore and sealingly cooperating with said actuating piston, said stepped piston including a large diameter part received in said large diameter portion of said bore and a small diameter part received in said small diameter portion and communicating with atmospheric pressure via a vent port defined in said actuating piston, said large and small diameter parts cooperating to define a differential area on said stepped piston;
   said stepped piston defining an axially-extending blind bore opening to said pressure chamber and a radially-extending bore communicating said blind bore with said inlet orifice via said radially-extending flow path and said annular groove;
   said blind bore of said stepped piston receiving a movable valve member, a resilient member biasing said valve member toward the open end of said blind bore, and an annular valve seat secured in said blind bore at the open end thereof for movement with said stepped piston, said valve seat being sealingly engageable with said valve member;
   said valve means further including an annular abutment member mounted in said stepped bore and secured to said actuating piston for movement in unison therewith, said abutment member carrying an axially-extending projection extending through said annular valve seat and engaging said valve member;
   a resilient member received in said stepped bore biasing said stepped piston to a first position in engagement with said annular abutment member in which said valve seat is disengaged from said valve member by said axially-extending projection so that said valve means is open;
   said stepped piston moving toward the end wall of said stepped bore in response to pressurized fluid from said pressure source to engage said valve seat with said valve member to close said valve means at a predetermined pressure level, said stepped piston reciprocating to open and close said valve means so as to allow a selected pressure increase in said pressure chamber responsive to a pressure increase above said predetermined pressure level.

2. The invention of claim 1 wherein said actuating piston further includes another bore communicating said radially-extending flow path with said pressure chamber, a normally closed pressure-responsive valve apparatus received in said other bore opening responsive to a predetermined pressure difference between said flow path and said pressure chamber to communicate pressurized fluid from said pressure source to said pressure chamber.

* * * * *